M. L. BYRN & G. CLARK.
GATHERER FOR FRUIT, &c.

No. 31,527. Patented Feb. 26, 1861.

UNITED STATES PATENT OFFICE.

MARCUS L. BYRN AND GEORGE CLARK, OF NEW YORK, N. Y.

IMPROVEMENT IN FRUIT-GATHERERS.

Specification forming part of Letters Patent No. 31,527, dated February 26, 1861.

*To all whom it may concern:*

Be it known that we, MARCUS L. BYRN and GEORGE CLARK, of the city and State of New York, have invented, made, and applied to use a certain new and useful Improvement in Fruit-Gatherers; and we do hereby declare that the following is a full, clear, and exact description of the said invention, reference being had to the annexed drawings, making part of this specification, wherein—

Figure 1:
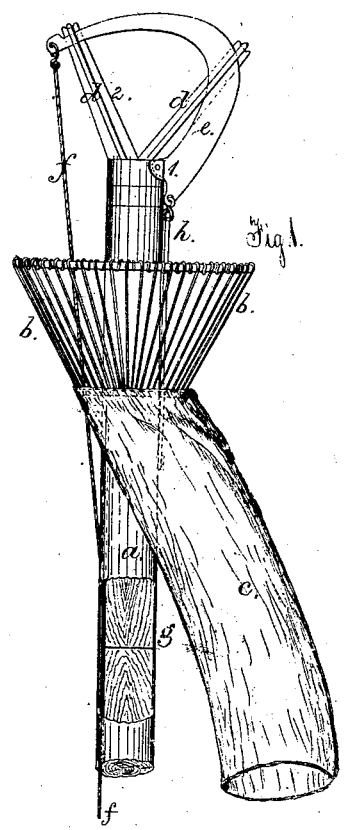
Figure 2:
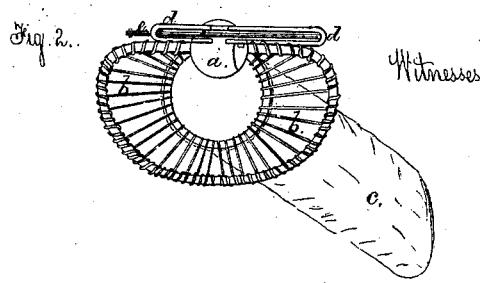

Figure 1 is an elevation, and Fig. 2 is a plan, of our said gatherer.

Similar marks of reference denote the same parts.

Several devices have heretofore been made in which a bag extended from a basket into which the fruit falls.

The nature of our said invention consists in a peculiar construction and arrangement of cutting device which separates the fruit and delivers the same into a basket, from which a canvas or other bag extends and conveys the fruit to the party using the gatherer.

In the drawings, $a$ is a rod or pole, on which a basket, $b$, is attached, with an open bottom, to which the bag or pipe $c$, of canvas or other material, is attached. At the upper end of this pole $a$ is a fork, $d$, made double, so that the knife $e$ is contained in and moves across the slot formed between the parts of this fork $d$. Said knife $e$ is formed of the shape represented, and is jointed to the rod $a$ at 1, and provided with a contractile rubber or other spring, $h$, that keeps the knife $e$ in the position shown, except when said knife is drawn across by the cord $f$. It will now be seen that the knife $e$ is passed over the fruit, and the fork $d$ goes on each side thereof, the opening being sufficient for the purpose, and on drawing down the cord $f$ the knife $e$ passes across, severing the stem against the edge 2 of the fork $d$. This gatherer is adapted to apples, pears, grapes, quinces, and other kinds of fruit; and as the stem is severed by the knife $e$ the fruit drops through the basket $b$, and is conveyed to the party using the implement through the pipe $c$.

In order to extend the rod or pole $a$, the sleeves $g$ may be provided at one end of each length, forming a socket for the end of the next section, and the cord $f$ should pass through a groove in the pole, so as not to become entangled in the foliage.

Our gatherer, it will be seen, is simple, cheap, and reliable, and is not likely to injure the fruit, and when once placed over the fruit the gathering is certain and instantaneous upon pulling the cord $f$.

What we claim, and desire to secure by Letters Patent, is—

The fork $d$ and knife $e$, constructed and acting, as specified, in combination with the pole $a$, basket $b$, and pipe $c$, as set forth.

In witness whereof we have hereunto set our signatures this 21st day of November, 1860.

MARCUS L. BYRN.
    GEORGE CLARK.

Witnesses:
 LEMUEL W. SERRELL,
 CHAS. H. SMITH.